(12) United States Patent
Houghton et al.

(10) Patent No.: US 11,102,960 B2
(45) Date of Patent: Aug. 31, 2021

(54) MARINE VIDEO MONITORING APPARATUS

(71) Applicant: The Queen's University of Belfast, Belfast (GB)

(72) Inventors: Jonathan Houghton, Bangor (GB); Paul Mayo, Glenavy (GB); Simon Exley, Lancaster (GB); Paul Mensink, London (CA)

(73) Assignee: The Queen's University of Belfast, Antrim (GB)

( * ) Notice: Subject to any disclaimer, the term of this patent is extended or adjusted under 35 U.S.C. 154(b) by 0 days.

(21) Appl. No.: 16/964,691

(22) PCT Filed: Jan. 14, 2019

(86) PCT No.: PCT/EP2019/050835
§ 371 (c)(1),
(2) Date: Jul. 24, 2020

(87) PCT Pub. No.: WO2019/145182
PCT Pub. Date: Aug. 1, 2019

(65) Prior Publication Data
US 2020/0344980 A1 Nov. 5, 2020

(30) Foreign Application Priority Data
Jan. 26, 2018 (GB) ..................... 1801340

(51) Int. Cl.
*A01K 29/00* (2006.01)
*H04N 5/225* (2006.01)
(Continued)

(52) U.S. Cl.
CPC ............ *A01K 29/005* (2013.01); *A01K 69/00* (2013.01); *A01K 93/00* (2013.01); *A01K 97/02* (2013.01);
(Continued)

(58) Field of Classification Search
CPC .... A01K 29/005; A01K 69/00; H04N 5/2253; H04N 5/247; H04N 7/18; G06Q 50/02; A01M 23/00
(Continued)

(56) References Cited

U.S. PATENT DOCUMENTS 4,870,778 A * 10/1989 Sheppard ............... A01K 97/05
43/55
4,914,856 A * 4/1990 Kennedy ................ A01K 69/00
43/100
(Continued)

FOREIGN PATENT DOCUMENTS

GB 1439585 6/1976
RU 2167434 5/2001

OTHER PUBLICATIONS

Zintzen et al., (2012) Diversity and Composition of Demersal Fishes along a Depth Gradient Assessed by Baited Remote Underwater Stereo-Video PLoS ONE 7(10): e48522. https://doi.org/10.1371/journal.pone.0048522 (Year: 2012).*
(Continued)

*Primary Examiner* — Marnie A Matt
(74) *Attorney, Agent, or Firm* — Gardner, Linn, Burkhart & Ondersma LLP

(57) ABSTRACT

A video monitoring apparatus for assessing marine diversity includes a support frame, one or more cameras mounted on the support frame for recording images, and a bait receptacle mounted on the support frame for holding bait. The bait receptacle is adapted to release bait therefrom when the support frame comes to rest on a surface.

14 Claims, 5 Drawing Sheets

(51) Int. Cl.
*H04N 5/247* (2006.01)
*H04N 7/18* (2006.01)
*A01K 97/02* (2006.01)
*A01K 97/05* (2006.01)
*A01K 69/00* (2006.01)
*A01K 93/00* (2006.01)
*G06Q 50/02* (2012.01)

(52) U.S. Cl.
CPC ........... *A01K 97/05* (2013.01); *H04N 5/2253* (2013.01); *H04N 5/247* (2013.01); *H04N 7/18* (2013.01); *G06Q 50/02* (2013.01)

(58) Field of Classification Search
USPC .......................................................... 348/81
See application file for complete search history.

(56) References Cited

U.S. PATENT DOCUMENTS

| | | | | | |
|---|---|---|---|---|---|
| 6,138,400 | A | * | 10/2000 | Gervae | A01K 97/02 43/44.99 |
| 7,437,850 | B1 | * | 10/2008 | Seay | A01K 93/00 43/44.87 |
| 2012/0260561 | A1 | * | 10/2012 | Stuart | A01K 69/00 43/60 |
| 2016/0309691 | A1 | * | 10/2016 | Ancona | A01K 97/02 |
| 2018/0136144 | A1 | * | 5/2018 | Blunk | G01N 21/952 |

OTHER PUBLICATIONS

Westling et al., A Modular Learning Approach for Fish Counting and Measurement Using Stereo Baited Remote Underwater Video, 2014 International Conference on Digital Image Computing: Techniques and Applications (DICTA), Wollongong, NSW, 2014, pp. 1-7, doi: 10.1109/DICTA.2014.7008086 (Year: 2014).*

International Search Report and Written Opinion of the ISA from corresponding PCT Application No. PCT/EP2019/050835, dated May 2, 2019.

UK Search Report of corresponding Application No. GB1801340.9, dated Jul. 23, 2018.

Andreas Marouchos, et al., Development of a Stereo Deepwater Baited Remote Underwater Video System (DeepBRUVS), CSIRO Marine and Atmospheric Research, Jun. 2011.

* cited by examiner

MARINE VIDEO MONITORING APPARATUS

CROSS REFERENCE TO RELATED APPLICATIONS

The present application is § 371 national stage of International Application PCT/EP2019/050835, filed Jan. 14, 2019, which claims priority benefit of U.K. Pat. Application Ser. No. 1801340.9, filed Jan. 26, 2018, both of which are hereby incorporated herein by reference in their entireties.

FIELD OF THE INVENTION

This invention relates to a marine video monitoring apparatus for monitoring marine life, and in particular, to an underwater video monitoring apparatus for assessing marine diversity.

BACKGROUND OF THE INVENTION

Changes to fishing quotas has resulted in significant changes in fisheries practice, such as a decline of cod as a target species and an increased focus on crustaceans, in particular Nephrops *norvegicus* (commonly known as Norway lobster or Dublin Bay prawn). The most common method of catching Nephrops is by bottom trawling.

Therefore Nephrops are commonly taken in mixed fisheries. This has resulted in an increase in discards, particularly when unselective bottom trawling is carried out. Such increase in discards appears to correlate with an increased prevalence of and *Scyliorhinus canicula*, commonly known as dogfish, which feed mainly on fish and crustaceans and are generalist scavengers.

There is a need for research to determine the relationship between dogfish numbers and the fishing of Nephrops, and resulting increase in fisheries discards, and also the possible ecological consequences of a ban on fisheries discards. There is a particular need to determine how long it takes for initial scavengers to arrive at discards, the composition of the scavengers and to what extent dogfish are availing of fisheries discards by studying the natural feeding behaviour of such scavengers.

It is known to assess marine diversity by placing underwater cameras mounted on a frame which is lowered onto on the sea bed and using bait to attract marine life which can be monitored using the cameras over a period of time. In such known systems the bait is typically held within a mesh bag attached to the frame or released as an odour plume (by way of an emulsified liquid released over time) that serves as an attractant for marine species. Such mesh bait bags attract predators to the bait but do not allow access to the bait. This approach is useful for assessing the biodiversity of species in an area but does not allow any scientific investigation about the fate of prey or the foraging behaviour of scavengers and does not replicate natural feeding habits of such scavengers. Odour plumes tend to attract a broad range of predators but are not target species specific and again do not allow the bait to be ingested by scavengers and provides no information regarding the natural succession of invertebrate and vertebrate scavengers, inter-species competition and, where possible, the fate of the discards themselves. This is a limitation at present for investigations into the EU fisheries discards ban, where research is needed into the fate of fisheries discards and the types of predators attracted by the discards and thus resulting changes in the biodiversity of the marine environment. There is also a risk of the mesh bait bags being ingested by large predators.

SUMMARY OF THE INVENTION

According to the present invention there is provided a video monitoring apparatus for assessing marine diversity includes a support frame, one or more cameras mounted on the support frame for recording images, and a bait receptacle mounted on the support frame for holding bait, the bait receptacle being adapted to release bait therefrom when the support frame comes to rest on a surface.

Optionally, the bait receptacle is adapted to receive whole bait and incorporates a closure moveable between a closed configuration, in which configuration bait is retained within the bait receptacle, and an open configuration, in which configuration bait is released from the bait receptacle, a retaining device being provided for retaining the closure in its closed configuration, a trigger mechanism being arranged to release the retaining device, allowing the closure to move to its open configuration releasing the bait, when the support frame comes to rest on a surface.

The trigger mechanism includes an actuating member displaceable between a first position and a second position, a portion of the actuating member depending from the support frame when in its first position, such that said actuating member is displaced from its first to its second position due to the actuating member engaging a surface as the frame member comes to rest thereon, the actuating member being coupled to the retaining device such that the retaining device is released as the actuating member is displaced from its first position to its second position. In one embodiment the actuating member includes an enlarged base portion and a vertically extending upright portion extending upwardly from the base portion, the upright portion being guided in a guide provided on the support frame to permit vertical movement of the actuating member with respect to the support frame between the first and second positions thereof.

The upright portion of the actuating member may include a pair of parallel rods, the guide including one or more guide members extending between the parallel rods. A first guide member may be provided at or adjacent a lower end of the support frame and a second guide member is provided at or adjacent an upper end of the support frame. The one or more guide members may extend between a respective pair of parallel guide bars between which the actuating member is located.

In one embodiment the closure member defines at least a portion of a bottom wall of the bait receptacle.

The retaining device may include at least one retaining pin adapted to retain the closure member in its closed configuration when in an operative position, the at least one retaining pin being coupled to the actuating member such that the at least one retaining pin is pulled out of its operative position, releasing the closure member, when the actuating member is moved from its first to its second positon. The at least one retaining pin is optionally coupled to the actuating member via a linkage. The linkage may include a wire, string, chain or similar elongate flexible member.

The support frame may be a cuboid framework of bars or rods. The bait receptacle may be mounted on a cantilevered extension to one side of the cuboid framework. The bait receptacle may be a cuboid box. The closure may define a lower wall of the cuboid box. The closure may be defined by one or more doors hingedly coupled to the remainder of the bait receptacle.

These and other objects, advantages and features of the invention will become apparent upon review of the following specification in conjunction with the drawings.

BRIEF DESCRIPTION OF THE DRAWINGS

A marine video monitoring apparatus in accordance with an embodiment of the present invention will now be described, by way of example only, with reference to the accompanying drawings, in which.

DETAILED DESCRIPTION OF THE DRAWINGS

Figure 1:
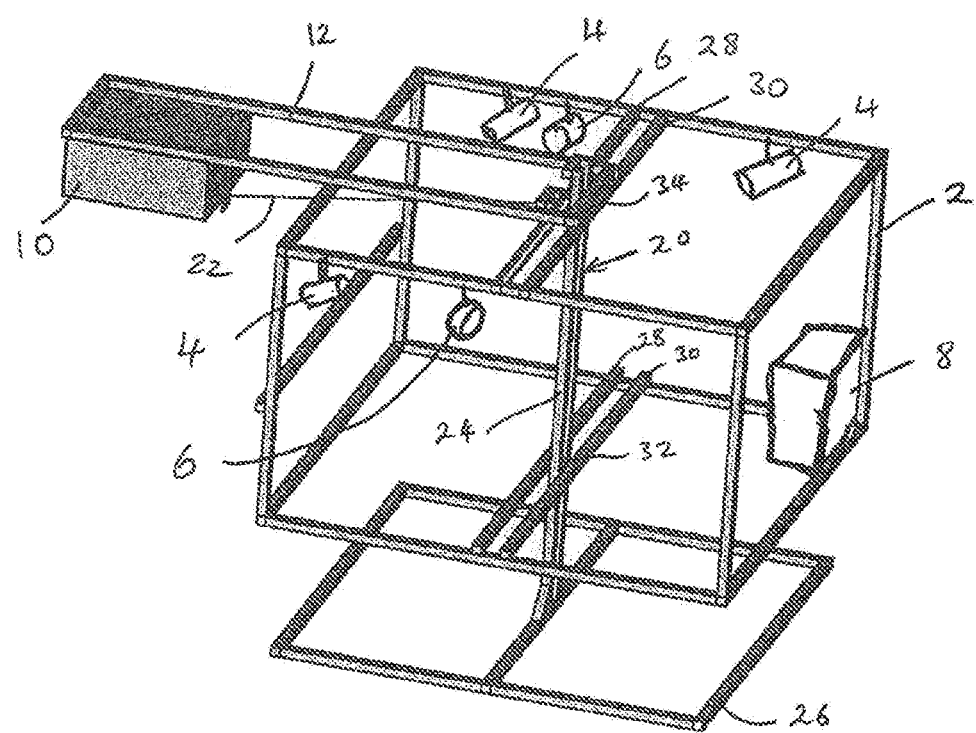
FIG. 1 is a perspective view of a marine video monitoring apparatus in accordance with an embodiment of the present invention prior to deployment onto the sea bed.

A marine video monitoring apparatus for monitoring marine life and in particular for assessing marine diversity the bait, as illustrated in the drawings, includes a substantially cuboid support frame 2 formed from a framework of steel bars upon which is supported a number of cameras 4 and lights 6. Other shapes, configurations or constructions of the support frame are envisaged. A control box 8 may also be mounted on the support frame 2 for containing control electronics and optionally a power supply, such as a battery. Alternatively the batteries and image processing/recording electronics may be integrally mounted in the cameras 4 and/or lights 6. It is also envisages that the cameras 4 and/or lights 6 may be connected to a power supply/image processing recording device via an umbilical extending to the surface.

A bait box 10 may be mounted on a cantilevered extension arm 12 extending from an upper side of the support frame 2, although it is envisaged that the bait box may be located at other positions on the support frame. The cameras 4 and lights 6 may all be mounted on the side of the support frame adjacent the bait box 10.

In the illustrated embodiment, the bait box 10 is a cuboid enclosure for containing bait, preferably whole bait, such as that typical of fisheries discards, a lower wall of the bait box being defined by a pair of doors 14 which are releasable from a closed position to an open position to release bait from the bait box 10 onto the sea bed for attracting predators to the apparatus such that the activities of such predators can be recorded by the cameras 4. The bait may be selected to attract specific target species.

The bait is released from the bait box 10 by means of a trigger mechanism actuated when the support frame 2, upon which the bait box 10 and cameras 4 are mounted, is deployed onto the sea bed such that the bait freely falls onto the sea bed adjacent the support frame 2 in the field of view of the cameras 4.

In the embodiment shown in the drawings the doors 14 of the bait box 10 are retained in a closed position by means of a pair of retaining pins 16 extending through a support plate 18 depending from an end wall of the bait box 10 such that the pins 16 abut the doors 14 to hold then in their closed position. Each retaining pin 16 is coupled to an actuating member 20 extending through the centre of the support frame 2 via respective wires 22.

The actuating member 20 may have an upright portion 24 extending through the support frame 2, such as through a central region thereof, and a base portion 16 arranged to depend from the support frame 2 for engaging the sea bed during deployment of the apparatus.

The base portion 26 of the actuating member 20 may be a rectangular frame 2 having dimensions corresponding to the bottom of the support frame 2, such as to fit within the framework defining a bottom end of the support frame 2.

Figure 2:
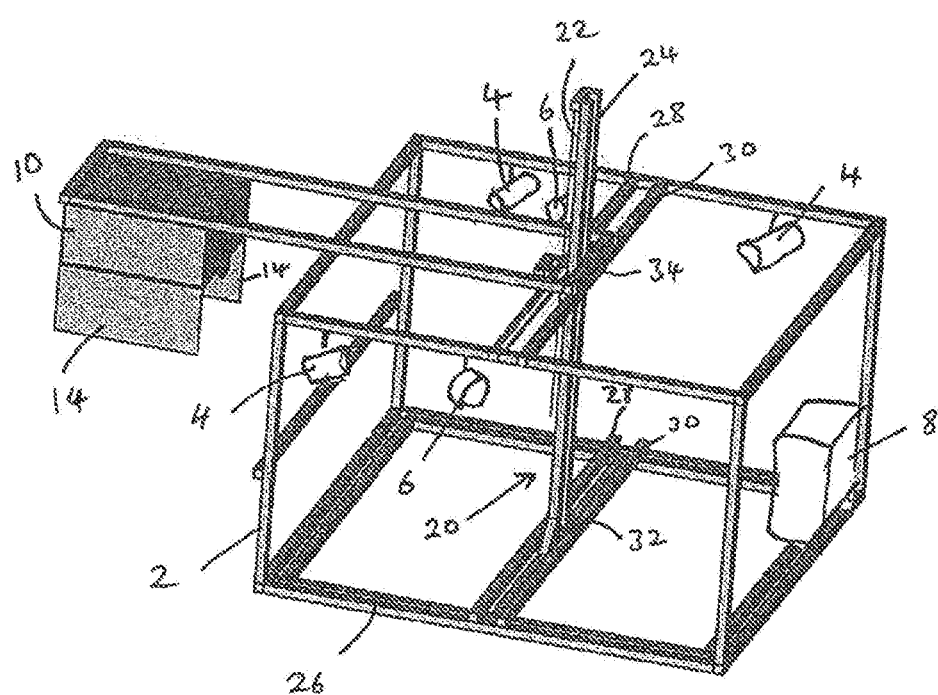
FIG. 2 is a perspective view of the apparatus of FIG. 1 once deployed.
Figure 3:
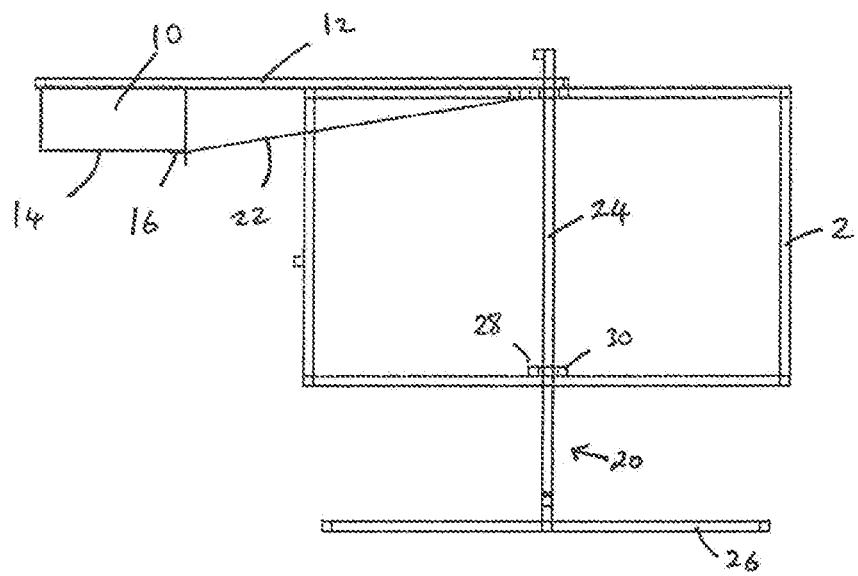
FIG. 3 is a side view of the apparatus of FIG. 1 prior to deployment.
Figure 4:
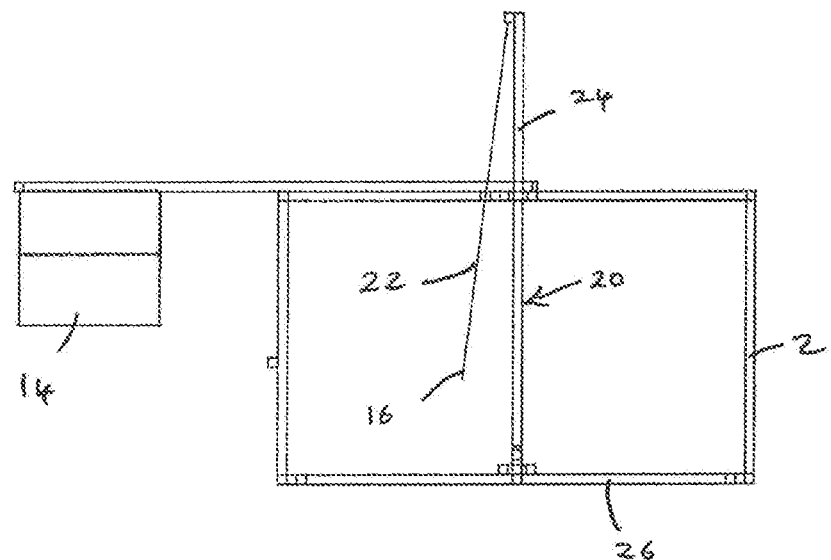
FIG. 4 is a side view of the apparatus of FIG. 1 once deployed.
Figure 5:
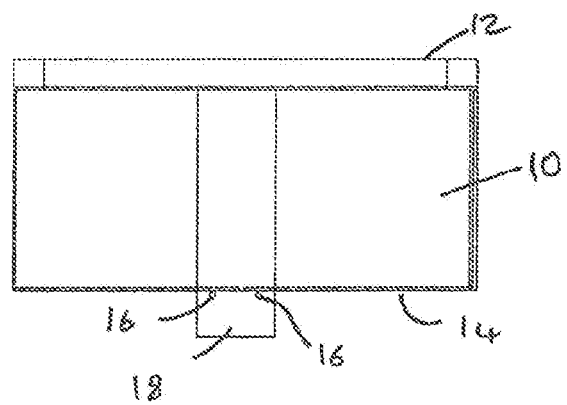
FIG. 5 is an end view of the bait box of the apparatus of FIG. 1 in a closed configuration.
Figure 6:
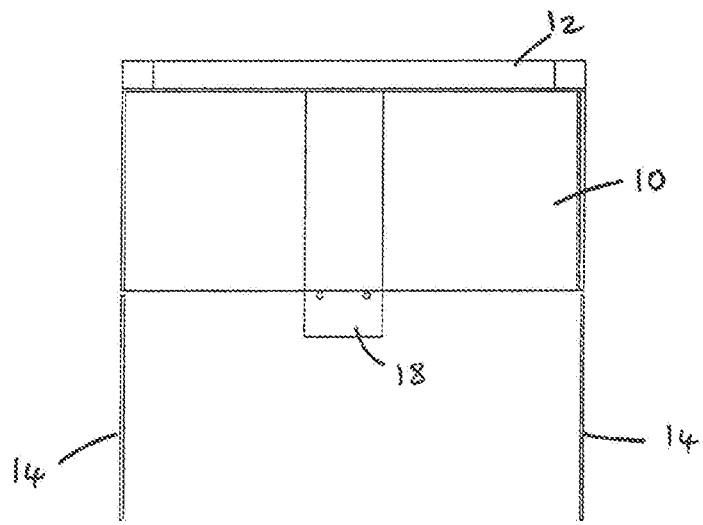
FIG. 6 is an end view of the bait box of the apparatus of FIG. 1 in an open configuration.
Figure 7:
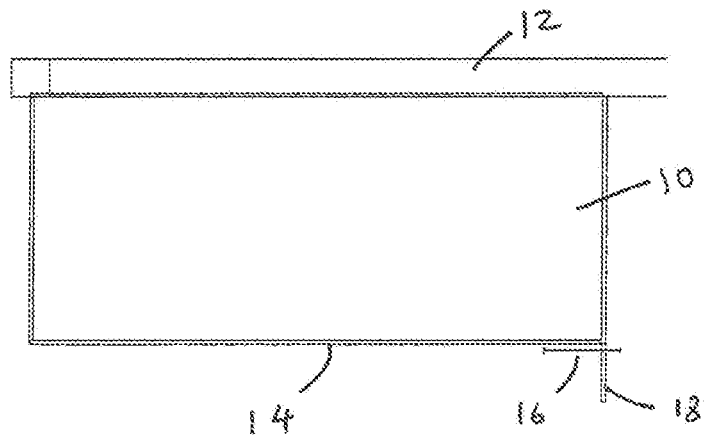
FIG. 7 is a side view of the bait box of the apparatus of FIG. 1 in its closed configuration.
Figure 8:
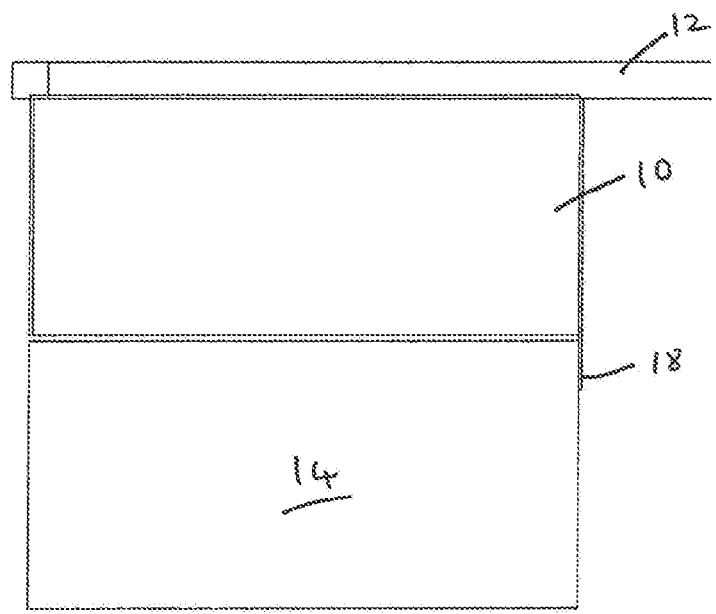
FIG. 8 is a side view of the bait box of the apparatus of FIG. 1 in its open configuration.

The upright portion of the actuating member 20 extends through guide members provided on the support frame 2. In the embodiment shown in the drawings the upright portion 24 of the actuating member 20 has a pair of vertically arranged parallel bars extending between pairs of laterally extending guide bars 28,30 located centrally between upper and lower sides of the support frame 2, guide members 32,34 extending between each pair of guide bars 28,30 to be located between the bars defining the upright portion 24 of the actuating member 20 such that the actuating member 20 is free to move vertically with respect to the support frame 2 between a first position, shown in FIGS. 1 and 3, wherein a lower end of the upright portion 24 of the actuating member 20 depends from the support frame 2 with the base portion 26 located below the support frame 2 and spaced therefrom, and a second position, shown in FIGS. 2 and 4, wherein base portion 26 of the actuating member 20 is substantially level with the bottom of the support frame 2 and an upper end of the upright portion 24 of the actuating member 20 extends upwardly from an upper end of the support frame 2.

Prior to deployment of the apparatus the support frame 2 is suspended from a suitable lifting device, such as a winch, with the actuating member 20 resting in its first position under gravity. In such configuration the doors 14 of the bait box 10 are retained in their closed position via the retaining pins 16 such that bait is retained within the bait box 10.

As the apparatus is deployed onto the sea bed, the base portion 26 of the actuating member 20 comes into contact with the sea bed and weight of the support frame 2 causes the actuating member 20 to be displaced through the support frame 2 to its second position until the support frame 2 rests on the sea bed. During such movement of the actuating member 20 the retaining pins 16 are pulled out of their support plate 18, releasing the doors 14 of the bait box 10 and allowing the bait contained therein to fall freely onto the sea bed in the field of view of the cameras 4.

Releasing the bait freely onto seabed allows marine predators to ingest items and compete freely with each other, thus replicating natural conditions at the seabed. Simulating the natural conditions for predators at the seabed improves the efficacy of biodiversity assessments and therefore can be used in the monitoring and designation of Marine Protected Areas, marine renewable energy installations, aquaculture pens etc. This apparatus will allow state agencies to meet statutory reporting on the ecological impacts of the EU fisheries discards ban.

The invention is not limited to the embodiment described herein but can be amended or modified without departing from the scope of the present invention, which is intended to be limited only by the scope of the appended claims as interpreted according to the principles of patent law including the doctrine of equivalents.

The invention claimed is:

1. A video monitoring apparatus for assessing marine diversity, said video monitoring apparatus comprising:
    a support frame;
    one or more cameras mounted on said support frame for recording images; and
    a bait receptacle mounted on said support frame for holding bait, said bait receptacle being adapted to release bait therefrom when said support frame comes to rest on a surface, said bait receptacle comprising:
        a closure moveable between a closed configuration, in which configuration bait is retained within said bait receptacle, and an open configuration, in which configuration bait is released from said bait receptacle;
        a retaining device being provided for retaining said closure in its closed configuration; and
        a trigger mechanism arranged to release said retaining device and allow said closure to move to its open configuration releasing the bait when said support frame comes to rest on the surface;
        wherein said bait receptacle comprises a cuboid box, and said closure defines a lower wall of said cuboid box.

2. An apparatus as claimed in claim 1, wherein said trigger mechanism includes an actuating member displaceable between a first position and a second position, a portion of said actuating member depending from said support frame when in the first position, such that said actuating member is displaced from its first to its second position due to said actuating member engaging the surface as said frame member comes to rest thereon, said actuating member being coupled to said retaining device such that said retaining device is released as said actuating member is displaced from its first position to its second position.

3. An apparatus as claimed in claim 2, wherein said actuating member comprises an enlarged base portion and a vertically extending upright portion extending upwardly from said base portion, said upright portion being guided in a guide provided on said support frame to permit vertical movement of said actuating member with respect to said support frame between the first and second positions.

4. An apparatus as claimed in claim 3, wherein said upright portion of said actuating member comprises a pair of parallel rods, said guide comprising one or more guide members extending between said parallel rods.

5. An apparatus as claimed in claim 4, wherein a first of said guide members is provided at or adjacent a lower end of said support frame and a second of said guide members is provided at or adjacent an upper end of said support frame.

6. An apparatus as claimed in claim 4, wherein said one or more guide members extend between a respective pair of parallel guide bars between which said actuating member is located.

7. An apparatus as claimed in claim 6, wherein said retaining device comprises at least one retaining pin adapted to retain said closure member in its closed configuration when said at least one retaining pin is in an operative position, said at least one retaining pin being coupled to said actuating member such that said at least one retaining pin is pulled out of its operative position, releasing said closure member, when said actuating member is moved from its first position to its second positon.

8. An apparatus as claimed in claim 7, wherein said at least one retaining pin is coupled to said actuating member via a linkage.

9. An apparatus as claimed in claim 8, wherein said linkage comprises a wire, string, chain, or elongate flexible member.

10. An apparatus as claimed claim 1, wherein said support frame comprises a cuboid framework of bars or rods.

11. An apparatus as claimed in claim 10, wherein said bait receptacle is mounted on a cantilevered extension to one side of said cuboid framework.

12. An apparatus as claimed in claim 1, wherein said closure is defined by one or more doors hingedly coupled to another portion of the bait receptacle.

13. A video monitoring apparatus for assessing marine diversity, said video monitoring apparatus comprising a support frame, one or more cameras mounted on said support frame for recording images, and a bait receptacle mounted on said support frame for holding bait, said bait receptacle being adapted to release bait therefrom when said support frame comes to rest on a surface, wherein said support frame comprises a cuboid framework of bars or rods.

14. A video monitoring apparatus for assessing marine diversity, said video monitoring apparatus comprising:
    a support frame;
    one or more cameras mounted on said support frame for recording images; and
    a bait receptacle mounted on said support frame for holding bait, said bait receptacle being adapted to release bait therefrom when said support frame comes to rest on a surface;
    wherein said bait receptacle incorporates a closure moveable between a closed configuration, in which configuration bait is retained within said bait receptacle, and an open configuration, in which configuration bait is released from said bait receptacle, a retaining device being provided for retaining said closure in its closed configuration, and a trigger mechanism arranged to release said retaining device and allow said closure to move to its open configuration releasing the bait when said support frame comes to rest on the surface;
    wherein said trigger mechanism includes an actuating member displaceable between a first position and a second position, a portion of said actuating member depending from said support frame when in the first position, such that said actuating member is displaced from its first to its second position due to said actuating member engaging the surface as said frame member comes to rest thereon, said actuating member being coupled to said retaining device such that said retaining device is released as said actuating member is displaced from its first position to its second position; and
    wherein said closure member defines at least a portion of a bottom wall of said bait receptacle.

* * * * *